Figure 1:
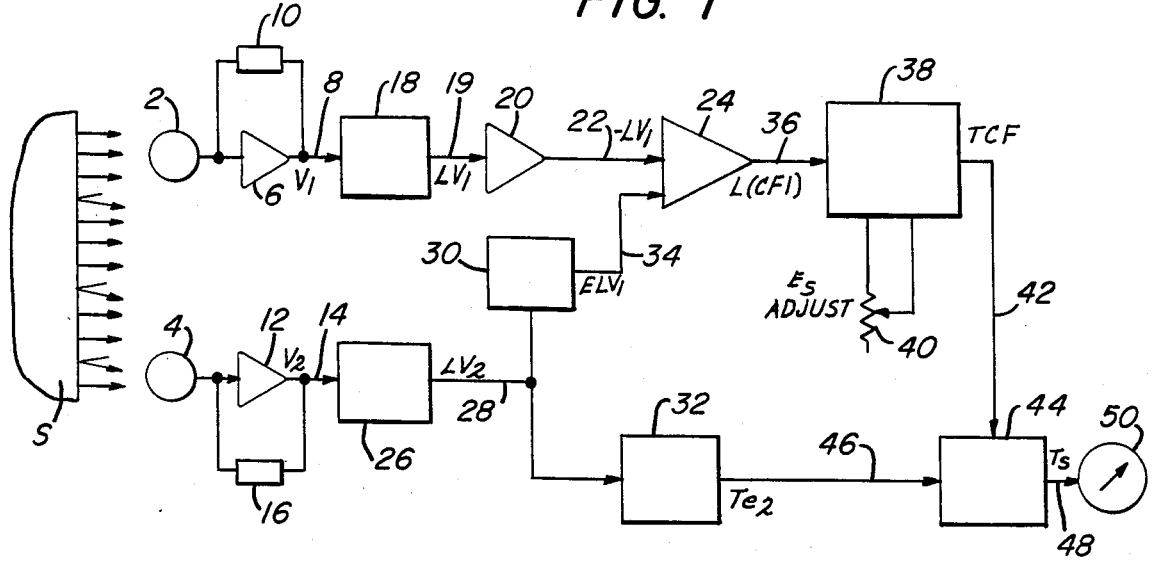

United States Patent

Rudolph

[19]

[11] Patent Number: 4,579,461

[45] Date of Patent: Apr. 1, 1986

[54] DUAL SENSOR RADIATION PYROMETER

[75] Inventor: Ralph G. Rudolph, Pittsburgh, Pa.

[73] Assignee: United States Steel Corporation, Pittsburgh, Pa.

[21] Appl. No.: 465,951

[22] Filed: Feb. 14, 1983

[51] Int. Cl.$^4$ .......................... G01J 5/32; G01N 25/20
[52] U.S. Cl. ........................................ 374/9; 250/340; 250/571; 364/571; 374/126; 374/173
[58] Field of Search ............... 374/129, 123, 126, 124, 374/172, 9, 128; 356/45; 364/571, 357; 219/553; 250/339

[56] References Cited

U.S. PATENT DOCUMENTS

| | | | |
|---|---|---|---|
| 2,837,917 | 6/1958 | Machler | 374/126 |
| 3,433,052 | 3/1969 | Maley | 374/124 X |
| 3,539,807 | 11/1970 | Bickel | 374/129 X |
| 3,610,592 | 10/1971 | Murray | 374/129 |
| 3,635,088 | 1/1972 | Poncet | 356/45 |
| 3,715,922 | 2/1973 | Menge | 356/45 X |
| 3,796,099 | 3/1974 | Shimotsuma et al. | 374/126 |
| 3,992,943 | 11/1976 | Schiefer et al. | 356/45 X |
| 4,172,383 | 10/1979 | Iuchi | 374/126 X |
| 4,225,230 | 9/1980 | Dostoomian | 356/45 |
| 4,272,197 | 6/1981 | Knop | 364/850 X |

OTHER PUBLICATIONS

"Mass Scale Linearizer", IBM Tech. Bulletin, A. Halperime et al. pp. 1581-1582, (vol 10, #10, 1968).

Primary Examiner—Daniel M. Yasich
Attorney, Agent, or Firm—John F. Carney

[57] ABSTRACT

A pyrometer for determining the temperature of a surface in the presence of reflected radiation has two infrared radiation sensors, each responsive to different wave length, positioned to receive radiation from the surface. An adjustment factor is developed from sensor response signals when reflected radiation and surface temperatures are the same, and is combined with sensor response characteristics over a range of surface and sensor indicated temperatures to develop a correction factor which when multiplied by the indicated temperature provides the actual surface temperature.

11 Claims, 4 Drawing Figures

DUAL SENSOR RADIATION PYROMETER

This invention relates to a pyrometer for measuring the temperature of heated products such as a steel slab or billet in a heating furnace, and more particularly to a dual sensor radiation pyrometer that accurately determines the product temperature in the presence of a substantial amount of reflected external radiation.

Accurate knowledge of the temperature of a steel slab or billet in a reheating furnace is necessary to reduce fuel costs and to increase productivity. It is generally impractical to use contact methods for product temperature determination. A far more practical method for temperature determination is the measurement of thermal radiation emitted by the product. A fundamental problem in measuring thermal radiation is that the radiation received by a sensor sighted on the product consists of two components, the radiation emitted by the product and the radiation emitted from the furnace walls that is reflected from the product surface into the sensor.

One method of eliminating the reflected radiation component is to shield the product area viewed with water-cooled sight tubes. This method has been limited to furnaces operating at low temperatures, and it is not useful where product movement could damage the equipment or where there is a wide variety of product sizes.

Another method is to use an additional sensor to measure or infer the amount of reflected radiation which must be subtracted from the radiation received from the product. This method may be reasonably accurate, but using an additional sensor viewing the furnace emitted radiation, either directly or from a water-cooled target, requires additional viewing ports and careful selection of viewing areas. The method is unsatisfactory where furnace temperatures are not uniform.

Still another method is to use two sensors operating at different wavelengths sighting on the product whose outputs may be mathematically manipulated to compute the product temperature. The mathematics may be of sufficent complexity to require the use of a digital computer or a dedicated microprocessor and thus obviate the possibility of a flexible stand-alone type of instrument capable of operating in real-time. The accuracy of this method is dependent upon the accuracy of mathematical relationships used, which may be a fixed correction factor or a factor based on the ratio of the sensor outputs.

It is, therefore, an object of my invention to provide a non-contacting pyrometer that accurately measures the surface temperature of an object inside a furnace in the presence of reflected radiation.

Another object is to provide a pyrometer that is capable of measuring such temperature in real-time and which may be used as a stand-alone instrument over a range of furnace temperatures and a range of objects inside the furnace.

Figure 2:
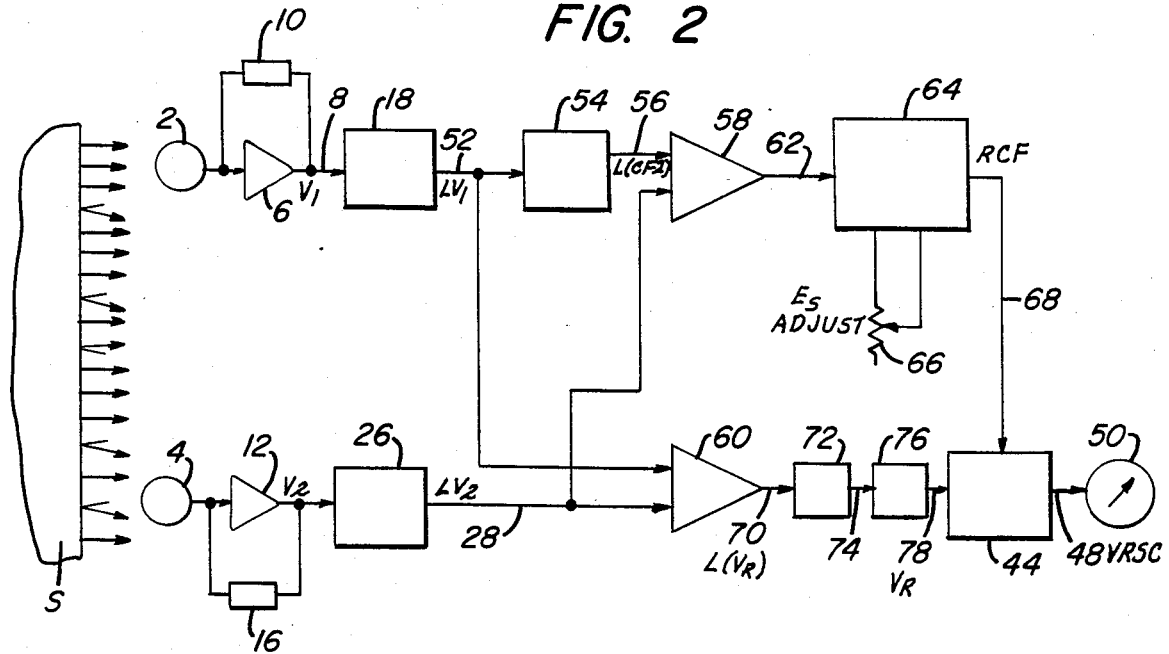
Figure 3:
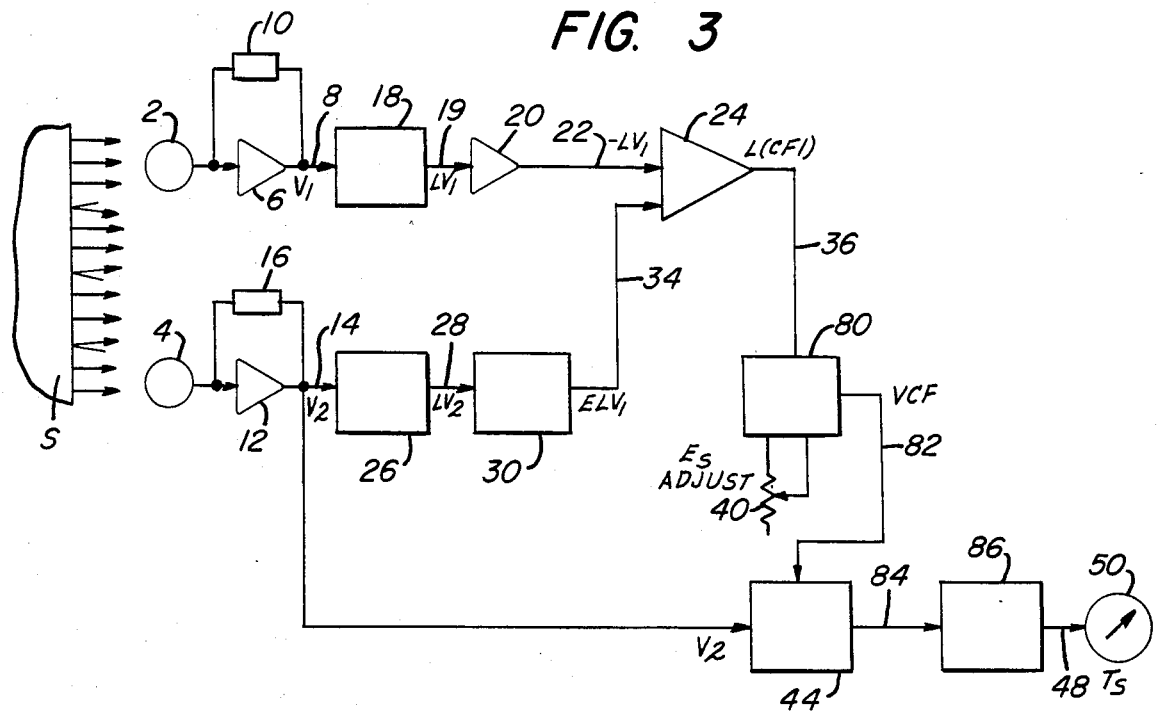
Figure 4:
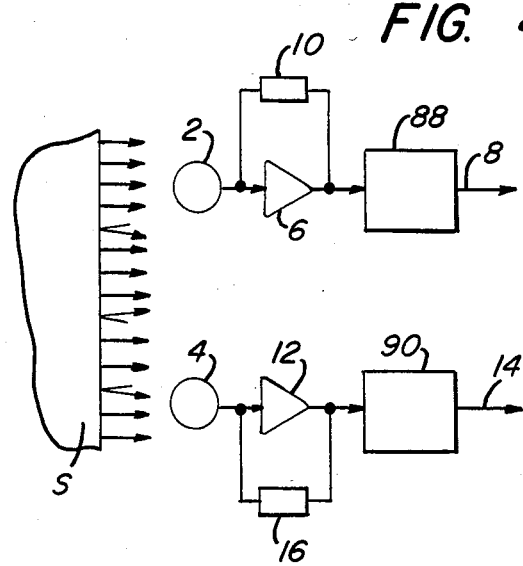

These and other objects will become more apparent after referring to the following specification and drawings in which FIG. 1 is a schematic drawing of the preferred embodiment of my invention, FIG. 2 is a schematic drawing of a second embodiment of my invention, FIG. 3 is a schematic drawing of a third embodiment of my invention, and FIG. 4 is a partial schematic drawing showing a circuit eliminating flame effects.

Referring now to FIG. 1, reference numeral 2 is a first infrared sensor, preferably a silicon photodiode positioned to receive radiation, both reflected and emitted from a heated slab S in a reheating furnace (not shown). Sensor 2 has a narrow band filter to provide responses only to specific wavelengths over the operating temperature range. A second sensor 4, also a silicon photodiode, is positioned to receive radiation from slab S at the same location as sensor 2. Sensor 4 has a narrow band filter to provide responses to specific wavelengths different from sensor 2, preferably sensor 4 is responsive to longer wavelengths than sensor 2. The output of sensor 2 is connected to the input of a first operational amplifier 6 which has a voltage output 8, linearly proportional to the radiation received by sensor 2, and a feedback resistor 10. The output of sensor 4 is connected to the input of a second operational amplifier 12 which has a voltage output 14, linearly proportional to the radiation received by sensor 4, and a feedback resistor 16.

Output 8 of amplifier 6 is connected to the input of a first logarithmic amplifier 18. Amplifier 18 has an output 19 connected to the input of an inverted 20. Inverter 20 has an output 22 connected to a first input of an adder circuit 24.

Output 14 of amplifier 12 is connected to the input of a second logarithmic amplifer 26. Amplifier 26 has an output 28 connected to the input of a first function generator 30 and to the input of linearizing circuit 32. Function generator 30 has an output 34 connected to a second input of adder 24.

Adder 24 has an output 36 connected to the input of a second function generator 38. Function generator 38 has an adjustable resistor 40 for adjusting the gain of an amplifier in generator 38 and an output 42 connected to a first input of a multiplier circuit 44. Circuit 32 has an output 46 connected to a second input of multiplier 44. Multiplier 44 has an output 48 connected to a temperature indicator 50.

Steel slab reheating furnaces operate in a temperature range from 2100° F. to 2500° F., with final slab temperatures ranging from 2100° F. to 2300° F. Over these operating ranges, silicon photodiodes are commonly used as sensors for infrared radiation. These sensors respond to near infrared radiations from about 1.1 micron wavelength to wavelengths in the visible range, but may be equipped with narrow-band filters to provide responses only to specific wavelengths in this range.

Sensors 2 and 4 approximately linearly convert incoming radiation into a current output when operating in a short-circuit mode. The current output is converted by amplifiers 6 and 12 to voltage outputs 8 and 14, designated as $V_1$ and $V_2$ respectively, linearly proportional to the amount of radiation received by each sensor.

If sensors 2 and 4 view a surface temperature, $T_s$, for slab S, the amount of radiation, R, received by each sensor under narrow-band conditions is given by Wien's Law:

SENSOR 2

$$R_{\lambda 1} = C_1 E_s \lambda_1^{-5} e^{-C_2/\lambda_1 T_s} \tag{1}$$

and,
SENSOR 4

$$R_{\lambda 2} = C_1 E_s \lambda_2^{-5} e^{-C_2/\lambda_2 T_s} \qquad (2)$$

where
- $C_1$ = a constant
- $C_2$ = 0.014388 M K
- $\lambda$ = wavelength, meters
- $T_s$ = surface temperature, °K
- $E_s$ = surface emittance Correspondingly, voltages $V_1$ and $V_2$ may be given as $$-V_1 = C_3 E_s e^{-C_2/\lambda_1 T_s} \qquad (3)$$

$$-V_2 = C_4 E_s e^{-C_2/\lambda_2 T_s} \qquad (4)$$

where $$C_3 = C_1 F_1 R_{f1} \lambda_1^{-5}$$

$$C_4 = C_1 F_2 R_{f2} \lambda_2^{-5}$$

$F_1$ and $F_2$ are sensor constants, and $R_{f1}$ and $R_{f2}$ are values of feedback resistors.

If $V_2$ is divided by $V_1$, the basis of "2-color"pyrometers, the resulting ratio, $V_R$, is independent of $E_s$, assuming $E_s$ is the same for both $\lambda_1$ and $\lambda_2$.

$$V_R = \frac{V_2}{V_1} = \frac{C_4}{C_3} e^{\frac{C_2(\lambda_2 - \lambda_1)}{T_s \lambda_2 \lambda_1}} \qquad (5)$$

If the slab S at temperature $T_s$ is placed inside a furnace operating at temperature $T_f$ (where $T_f > T_s$, as the furnace is heating the slab) sensors 2 and 4 will receive additional radiation from the furnace which is reflected from the surface. Assume that the furnace will have an effective emittance which approaches 1.0 in value as $T_s$ approaches $T_f$ (black body condition); the furnace emittance will therefore be considered to be 1.0. Assume also that the surface will reflect exactly (1-$E_s$) of the furnace-emitted radiation (the view factor for furnace radiation is 1.0) and assume also that the furnace temperature in the area being viewed is uniform. Under these assumptions the radiation emitted by the furnace will be identical in form to Equations 1 and 2, substituting $T_f$ for $T_s$ and (1-$E_s$) for $E_s$.

The total radiation received by sensors 2 and 4 will then produce outputs found by summing the surface emitted radiation and the furnace reflected radiation as follows:

$$-V_1 = C_3 [E_s e^{-C_2/\lambda_1 T_s} + (1 - E_s) e^{-C_2/\lambda_1 T_f}] \qquad (6)$$

and, $$-V_2 = C_4 [E_s e^{-C_2/\lambda_2 T_s} + (1 - E_s) e^{-C_2/\lambda_2 T_f}] \qquad (7)$$

If typical values are assigned to the factors in the equations and the results plotted, it is apparent that as the difference between $T_f$ and $T_s$ increases, the difference between the values of $V_1$ and $V_2$ and the voltages without reflected radiation also increases. If these voltages are converted to temperatures, the errors in temperature indications become readily apparent. If adjustments are made for emittance, then the indicated temperature error would approach zero as $T_s$ approaches $T_f$. When the temperatures are equal, black body conditions, the indicated temperatures would be the same. If $V_2$ is divided by $V_1$, the resulting ratio, $V_R$, decreases as the slab surface temperature increases, provided $V_2$ is derived from the sensor receiving the longer wavelength radiation. This indicates that as temperature increases, the amount of shorter wavelength radiation increases more rapidly than the amount of longer wavelength radiation. The addition of reflected radiation from the higher-temperature furnace would also result in a lower $V_R$ than the value of $V_R$ for the slab surface only. This difference in responses of the sensors when $T_s$ is not equal to $T_f$ as compared to the sensor responses when $T_f$ is equal to $T_s$ is applied to determine the actual slab temperature.

If the sensors receive a combination of both reflected and emitted radiation, Equations 3 and 4 may be rewritten to determine indicated temperatures $T_{e1}$ and $T_{e2}$ as follows:

$$-V_1 = C_3 e^{-C_2/\lambda_1 T_{e1}} \qquad (8)$$

and, $$-V_2 = C_4 e^{-C_2/\lambda_2 T_{e2}} \qquad (9)$$

assuming an emittance of 1. $T_{e1}$ is not equal to $T_{e2}$ except when the slab and furnace are at the same temperature, black body conditions. Under such conditions $V_R$ may be readily determined from equation 5 and therefore given a value of $V_1$ or $V_2$, the other can be calculated. However, the calculated values, $V_{e1}$ or $V_{e2}$, derived in this manner, will not be equal to $V_1$ or $V_2$ except when $T_s$ is equal to $T_f$. The differences between $V_{e1}$ and $V_1$, and between $V_{e2}$ and $V_2$, or combinations thereof may be applied to provide an adjustment factor which yields a reasonably accurate readout of slab surface temperature.

Adjustment factors, CF, may be developed as follows:

$$CF_1 = \frac{V_1}{V_{e1}} \qquad (10)$$

$$CF_2 = \frac{V_{e2}}{V_2} \qquad (11)$$

$$CF_3 = \frac{V_1 V_{e2}}{V_{e1} V_2} \qquad (12)$$

There are several methods for applying these adjustment factors to determine slab temperature. The indicated temperature $T_{e1}$ or $T_{e2}$ may be corrected, $V_R$ may be corrected or the voltage outputs $V_1$ or $V_2$ may be corrected. The choice would depend on the effect of surface emittance, the size of the error to be corrected and the simplicity of the required circuit. Since it appears that surface emittance effects all three methods in about the same manner, the first method appears preferable because it appears to have the lowest change in the required correction factor for a given change in the adjustment factor utilized and the circuitry is not complex.

In the first method, correcting the indicated temperature a temperature correction factor, TCF, is developed to provide the slab temperature $T_S$ from the indicated temperature, $T_{e2}$ according to the following equation:

$$T_S = T_{e2} \times TCF \qquad (13)$$

Knowing the response characteristics of the sensor, TCF may be calculated for various combinations of surface and furnace temperatures. If the values of TCF are plotted against adjustment factors CF1, CF2 and CF3, the plots are independent of combinations of assumed surface and furnace temperature provided the sensors respond in an exponential mode. Using curve fitting techniques, equations may be derived from the plot for calculating TCF from each of the adjustment factors.

In FIG. 1, radiation received by sensor 4 is converted to signal 14, $V_2$, by amplifier 12. $V_2$ is converted to a logarithmic signal 28, $1V_2$ by amplifier 26. Function generator 30, provides an altered output 34, $1V_{el}$. Since the $V_R$ function and the inputs and outputs of circuit 30 are all logarithmic, circuit 30 is preferably a circuit which changes or alters the gain or slope and zero shift of the straight-line logarithmic graph of equation 5.

Radiation received by sensor 2 is converted to signal 8, $V_1$ by amplifier 6. $V_1$ is converted to a logarithmic signal 19, $1V_1$ by amplifer 18. Inverter 20 makes adder 24 function as a subtractor, providing output 36, the logarithm of adjustment factor CF1 of equation 10, by subtracting $1V_1$ from $1V_{el}$.

Circuit 38 provides output 42, TCF, using the empirical equation derived from the plot of TCF and CF1 and with resistor 40 set for surface emittance. Output 28, $1V_2$, of amplifier 26 is connected to circuit 32 which provides a linearized, output 46, $T_{e2}$, which is a temperature indication according to the radiation received by sensor 4. Signals 42 and 46 are combined in multiplier circuit 44 according to equation 13 to provide output 48, $T_S$, to a suitable indicating instrument 50 for actual surface temperature readout.

In the second method, correcting $V_R$, a ratio correction factor RCF is developed to provide $V_{RSC}$, the value of $V_R$ resulting from the actual slab surface temperature according to the following equation:

$$V_{RSC} = RCF \times V_R \qquad (14)$$

where $V_R$ is the ratio of $V_2$ divided by $V_1$.

The value of RCF may be plotted against CF1, CF2 and CF3 and using curve fitting techniques. Equations may be derived from the plot for calculating RCF from each of the adjustment factors.

Referring to FIG. 2 which shows a circuit using the second method and in which the same circuit elements have the same numbers and same functions as in FIG. 1, an output 52 of amplifier 18 is connected to an input of a third function generator 54. Generator 54 has an altered output 56 connected to a first input of a first subtractor circuit 58. Output 52 is also connected to a first input of a second subtractor circuit 60. Output 28 of amplifier 26 is connected to a second input of subtractor 60. Subtractor 58 has an output 62 connected to the input of fourth function generator 64. Function generator 64 has an adjustable resistor 66 and an output 68 connected to an input of a multiplier 44. Subtractor 60 has an output 70 connected to the input of a second linerize circuit 72. Circuit 72 has an output 74 connected to the input of a fifth function generator 76. Generator 76 has an output 78 connected to a second input of multiplier 44. Multiplier 44 has an output 48 connected to a suitable indicator 50.

In FIG. 2, radiation received by sensor 4 is converted to signal 14, $V_2$, by amplifier 12. $V_2$ is converted to a logarithmic signal 28, $1V_2$, by logarithmic amplifier 26. Radiation received by sensor 2 is converted to signal 8, $V_1$, by amplifier 6. $V_1$ is converted to a logarithmic signal 52, $1V_1$, by logarithmic amplifier 18. Signal 52, $1V_1$, and signal 28, $1V_2$, are subtracted in circuit 60 to provide signal 70, log $V_R$. Linearizer circuit 72 converts signal 70, log $V_R$ to signal 74, $V_R$. Circuit 76, using equation 5, provides an output 78, which is the uncorrected temperature indication derived from $V_R$ and the known $V_R-T$ characteristics of the sensors.

Signal 52, $1V_1$ is converted to signal 56, $1V_{e2}$, by circuit 54 which is similar to, and functions in the same manner as, circuit 30 of FIG. 1. Output 56, $1V_{e2}$, of circuit 54 and signal 28, $1V_2$ are combined in subtractor circuit 56 to provide signal 62, CF2, according to equation 11. Circuit 64 provides output 68, RCF, using the empirical equations derived from the plot of RCF and CF2, and setting resistor 66 set for surface emission. Signal 68, RCF, and signal 78, indicated temperature based on $V_R$, are combined in circuit 44 according to equation 14 to provide signal 48 to a suitable indicating instrument 50 for actual surface temperature and readout.

In the third method, correcting either $V_1$ or $V_2$, a voltage correction factor, VCF, is developed to provide a corrected V, $V_c$, from the actual amplified voltage output of the sensor according to the following equation $$V_c = V_{CF} \times V \qquad (15)$$

where V is the amplified output of one of the sensors, and $V_c$ is the corrected voltage which is converted to a signal representing the actual slab surface temperature.

The value of VCF may be plotted against CF1, CF2 and CF3, and using curve fitting techniques, equations may be derived from the plot for calculating VCF from each of the correction factors.

Referring to FIG. 3 which shows a circuit using the third method and in which the same circuit elements have the numbers and same functions as in FIG. 1, output 36 of adder circuit 24 is connected to an input to a sixth function generator 80. Function generator 80 has an output 82 connected to an input of multiplier 44. Output 14 of amplifier 12 is also connected to an input of multiplier 44. Multiplier 44 has an output 84 connected to an input of a seventh function generator 86. Circuit 86 has an output 48 connected to an indicating instrument 50.

In FIG. 3 radiation received by sensor 4 is converted to signal 14, $V_2$, by amplifier 12 and connected to multiplier 44. Signal 14 is also converted to a logarithmic signal 28, $1V_2$, by amplifier 26. Function generator 30, according to equation 5, provides an output 34, $1V_{el}$. Radiation received from sensor 2 is converted to signal 8, $V_1$, by amplifier 6. $V_1$ is converted to a logarithmic signal 19, $1V_1$, by amplifier 18. Inverter 20 makes adder 24 function as a subtractor providing output 36, CF1 of equation 10, by subtracting $1V_1$ from $1V_{el}$.

Circuit 80 provides output 82, VCF of equation 15 using the empirical equation derived from the plot of VCF and CF1, and with resistor 40 set for surface emittance. Signals 82 and 14 are combined in multiplier 44 according to equation 15 to provide signal 84, $V_c$, the corrected output. Circuit 86 converts $V_c$ to a temperature indication, signal 48, on the basis of the temperature-voltage characteristics of sensor 4. Actual surface temperature is shown on indicator 50.

Signals 8 and 14 each have two components, radiation emitted by the surface and radiation reflected from the surface. In typical furnace operations, the sum of these two components is relatively steady which allows all components to operate as expected and to provide an accurate determination of surface temperature from signals 8 and 14. However, it is possible that sensors 2 and/or 4 may pick up radiation from the flame coming from the furnace burners and thus add erroneous and erratic values to signals 8 and or 14. To minimize errors caused by flames, a first valley picker circuit 88 is connected to the output of amplifier 6 and a second valley picker circuit 90 is connected to the output of amplifier 12 as shown in FIG. 4. The valley picker circuits act to eliminate the fluctuating signals above the base signal representing the reflected and emitted radiation from the slab surface.

The presence of flame effects can be determined by comparing the difference between the temperature readout based on correcting the output of sensor 2 with the temperature readout based on correcting the output of sensor 4.

The preferred embodiment has been described with sensor 4 sensitive to the longer-wave length radiation. This is preferred since $T_{e2}$ then is closer to the true slab temperature than $T_{e1}$. However, the invention, in all embodiments, will also function correctly with $V_1$ and $V_2$ reversed.

In addition, while equations 10, 11 and 12 describe these adjustment factors, only equations 10 and 11, CF1 and CF2 are illustrated in the three methods. A computer program was developed to calculate the pyrometer response for combinations of furnace and surface temperatures with readouts of $T_{e1}$ and $T_{e2}$ and the results of using CF1, CF2 and CF3 to calculate the slab surface temperature. The results show that any of these adjustment factors result in fairly accurate readout of slab surface temperature over a wide range of combinations of furnace and slab temperatures. Circuitry for developing CF2 is similar to as circuitry for developing CF1. Circuitry for CF3 requires additional multiplication.

I claim:

1. A pyrometer for measuring a surface temperature of a heated object in the presence of surface emitted radiation and surface reflected radiation originating from a source which is at a different temperature from said surface, and comprising:
    a first radiation sensor means positioned for receiving and responding to a first wavelength of said surface radiations in order to provide a first signal indicative of said radiations;
    a second radiation sensor means, positioned to receive radiation generally from a same surface area as the first sensor means, for receiving and responding to a second wavelength of radiation different from said first wavelength in order to provide a second signal indicative of said radiations;
    altering means, operatively associated with said sensors, for operating on at least one of said first and second signals in order to provide altered first and second signals, such that said altered first and second signals are substantially identical under black body conditions;
    means, operatively associated with said altering means, for providing an adjustment factor indicative of a difference between said altered signals when not under black body conditions;
    means, operatively associated with said adjustment factor providing means, for providing a correction factor signal according to said adjustment factor and a surface emissivity factor;
    means, operatively associated with at least one of said sensors, for providing a signal of indicated temperature, said indicated temperature being equal to said surface temperature under black body conditions;
    means for receiving and operating on said signal of indicated temperature and said correction factor signal in order to provide an output signal at least representative of said surface temperature; and
    means for receiving said output signal and indicating said surface temperature.

2. A pyrometer according to claim 1, and further comprising: a first valley picker circuit connected between the first amplifier and the first logarithmic amplifier and a second valley picker circuit connected between the second amplifier and the second logarithmic amplifier in order to minimize errors caused by flames.

3. A pyrometer apparatus as in claim 1, and further comprising:
    means for adjusting said emissivity factor in order to adjust said correction factor accordingly.

4. A pyrometer according to claim 1 in which the means for providing an adjustment factor comprises:
    a first amplifier connected to the first sensor for providing a first voltage output responsive to the radiation received by the first sensor;
    a first logarithmic amplifier connected to the first amplifier for providing a logarithmic response to the first voltage output;
    a second amplifier connected to the second sensor for providing a second voltage output responsive to the radiation received by the second sensor;
    a second logarithmic amplifier connected to the second amplifier for providing a logarithmic response to the second voltage output;
    a first function generator, connected to the second logarithmic amplifier and responsive to the second logarithmic response in order to provide said altered signals; and
    means connected to the first logarithmic amplifier and the first function generator for providing said adjustment factor.

5. A pyrometer according to claim 4 in which the means for providing a correction factor comprises:
    a second function generator for providing a temperature correction factor responsive to the adjustment factor; and
    means connected to the second function generator for providing an adjustment to the output of the second function generator in accordance with the emittance of the surface.

6. A pyrometer according to claim 4 in which the means for providing a correction factor comprises:
    a third function generator for providing a ratio correction factor by which errors in the ratio of the first voltage output to the second voltage output are correctable and responsive to the adjustment factor; and
    means connected to the third function generator for providing an adjustment to the ratio correction factor in accordance with emittance of the surface.

7. A pyrometer according to claim 6 and further comprising:
    circuit means connected to the first logarithmic amplifier and the second logarithmic amplifier for providing an output representative of the ratio of the first voltage output and the second voltage output, means, connected to the means for providing an output representative of the ratio of the first and second voltage outputs, responsive to the voltage ratio output in order to provide said signal of indicated temperature; and means, operatively associated with the means for providing a ratio correction factor and the means for providing said signal of indicated temperature, for indicating the surface temperature.

8. A pyrometer according to claim 4 in which the means for providing a correction factor comprises:

a fourth function generator for providing a voltage correction factor for the first voltage output, said fourth function generator being responsive to the adjustment factor and the response characteristics of the sensors, and means connected to the fourth function generator for adjusting said voltage correction factor in accordance with emittance of the surface.

9. A pyrometer according to claim 8, and further comprising:

circuit means, connected to the first amplifier and the means for providing a voltage correction factor, responsive to the first voltage output and the voltage correction factor for providing an output representative of a corrected first voltage output, and means, connected to the means for providing a corrected first voltage output, responsive to the corrected first voltage output for providing a signal indicative of the surface temperature.

10. A method of determining the temperature of a heated surface in the presence of radiation emitted from the surface and radiation reflected from the surface, said surface reflected radiation originating from a source at a different temperature from said surface, said method comprising the steps of:

positioning first and second sensors responsive to radiation of different wavelengths for receiving and responding to radiation from generally the same area of said surface and for providing respective first and second signals indicative of said radiation;

operating on at least one of said first and second signals in order to provide altered first and second signals, such that said altered signals are substantially identical under black body conditions;

providing an adjustment factor indicative of a difference between said altered signals when not under black body conditions;

providing a correction factor according to said adjustment factor and a surface emissivity factor;

providing a signal from at least one of said sensors corresponding to an indicated temperature, said indicated temperature being equal to said surface temperature under black body conditions;

operating on said signal corresponding to an indicated temperature and said correction factor in order to provide an output signal at least representative of said surface temperature; and indicating said surface temperature according to said output signal.

11. A method as in claim 10, and further comprising the step of:

adjusting said emissivity factor in order to adjust said correction factor accordingly.

* * * * *